United States Patent
Kryj-Kos (10) Patent No.: US 12,163,445 B1
(45) Date of Patent: Dec. 10, 2024

(54) COMPOSITE AIRFOIL ASSEMBLY HAVING A DOVETAIL

(71) Applicant: GENERAL ELECTRIC COMPANY, Schenectady, NY (US)

(72) Inventor: Elzbieta Kryj-Kos, Liberty Township, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/343,884

(22) Filed: Jun. 29, 2023

(51) Int. Cl.
*F01D 5/28* (2006.01)
*F01D 5/30* (2006.01)

(52) U.S. Cl.
CPC ............ *F01D 5/282* (2013.01); *F01D 5/3007* (2013.01); *F05D 2300/6032* (2013.01); *F05D 2300/6033* (2013.01)

(58) Field of Classification Search
CPC ............................... F01D 5/3007; F01D 5/282
See application file for complete search history.

(56) References Cited

U.S. PATENT DOCUMENTS

| | | | |
|---|---|---|---|
| 3,294,364 A | 12/1966 | Stanley | |
| 3,752,600 A | 8/1973 | Walsh et al. | |
| 4,111,606 A | 9/1978 | Prewo | |
| 4,363,602 A | 12/1982 | Martin | |
| 4,802,824 A | 2/1989 | Gastebois et al. | |
| 5,403,153 A | 4/1995 | Goetze | |
| 6,035,531 A * | 3/2000 | Besse | B64C 27/473 29/889.6 |
| 8,100,662 B2 | 1/2012 | Schreiber | |
| 8,105,042 B2 | 1/2012 | Parkin et al. | |
| 8,123,463 B2 | 2/2012 | Kray et al. | |
| 8,419,374 B2 | 4/2013 | Huth et al. | |
| 8,573,947 B2 | 11/2013 | Klinetob et al. | |
| 8,696,319 B2 | 4/2014 | Naik | |
| 8,794,925 B2 * | 8/2014 | McCaffrey | F01D 5/282 416/229 R |
| 9,828,861 B2 | 11/2017 | Le Hong | |
| 10,132,170 B2 * | 11/2018 | Garcia-Crespo | F01D 5/3084 |
| 10,174,624 B1 * | 1/2019 | McCaffrey | F01D 5/3007 |
| 10,619,493 B2 | 4/2020 | De Gaillard et al. | |
| 10,774,660 B2 | 9/2020 | Luczak | |
| 10,914,176 B2 | 2/2021 | Kamiya | |
| 11,459,908 B2 | 10/2022 | Decesare et al. | |
| 2017/0058912 A1 | 3/2017 | De Gaillard et al. | |
| 2018/0171806 A1 | 6/2018 | Freeman et al. | |
| 2021/0246791 A1 * | 8/2021 | McCaffrey | F01D 5/3084 |

* cited by examiner

*Primary Examiner* — Michael L Sehn
(74) *Attorney, Agent, or Firm* — McGarry Bair PC (57) ABSTRACT

A composite airfoil assembly for a turbine engine including an airfoil extending in a radial direction between a root and a tip to define a span length. The airfoil including a composite core and a set of skins overlying the composite core. The set of skins include an outer skin defining at least a portion of an exterior surface of the airfoil. A dovetail extends radially below the root, the dovetail including the composite core and the set of skins, the dovetail further including a fan skin overlying the outer skin proximate the root.

20 Claims, 6 Drawing Sheets

COMPOSITE AIRFOIL ASSEMBLY HAVING A DOVETAIL

TECHNICAL FIELD

The disclosure generally relates to a composite airfoil assembly having a dovetail, and more specifically to a composite airfoil assembly having the dovetail within a turbine engine.

BACKGROUND

Turbine engines, and particularly gas or combustion turbine engines, are rotary engines that extract energy from a flow of gases passing through a fan with a plurality of fan blades, then into the engine through a series of compressor stages, which include pairs of rotating blades and stationary vanes, through a combustor, and then through a series of turbine stages, which include pairs of rotating blade and stationary vanes. The blades are mounted to rotating disks, while the vanes are mounted to stator disks.

During operation air is brought into the compressor section through the fan section where it is then pressurized in the compressor and mixed with fuel in the combustor for generating hot combustion gases, which flow downstream through the turbine stages where the air is expanded and exhausted out an exhaust section. The expansion of the air in the turbine section is used to drive the rotating sections of the fan section and the compressor section. The drawing in of air, the pressurization of the air, and the expansion of the air is done, in part, through rotation of various rotating blades mounted to respective disks throughout the fan section, the compressor section and the turbine section, respectively. The rotation of the rotating blades imparts mechanical stresses along various portions of the blade; specifically, where the blade is mounted to the disk.

Composite materials typically include a fiber-reinforced matrix and exhibit a high strength-to-weight ratio. Due to the high strength-to-weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine. Extreme loading, sudden forces, or heat can be applied to the composite components of the aircraft or turbine engine. For example, extreme loading can occur to one or more airfoils during ingestion of various materials by the turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Aspects of the disclosure herein are directed to a turbine engine including a composite airfoil assembly including a dovetail and an airfoil. The composite airfoil can be used at one or more locations within the turbine engine. For example, the composite airfoil assembly is suitable as a fan blade in a fan section of a turbine engine. Although other locations, such as the compressor section and turbine section are contemplated. The composite airfoil assembly can be mounted in a variety of ways. One such mounting is securing the blades to a spinner of the fan section, directly, or via a pitch control assembly. Wherever the composite airfoil assembly is located, one suitable mounting is a disk assembly that has complementary sockets to receive the dovetail, with the sockets circumferentially spaced about the periphery of the disk assembly. The composite airfoil assembly and disk assembly can collectively form a rotating assembly such that the composite airfoil assembly is a composite blade assembly.

The composite airfoil assembly further includes a composite core and a set of skins including at least an outer skin and a fan skin. The outer skin overlies the composite core and the fan skin overlies at least a portion of the outer skin. The composite airfoil assembly is designed to withstand high mechanical stresses associated with the operation of the turbine engine. For purposes of illustration, the present disclosure will be described with respect to a composite airfoil assembly for a turbine engine, specifically a composite airfoil assembly provided within a fan section of the turbine engine. It will be understood, however, that aspects of the disclosure described herein are not so limited and can have general applicability within other engines or within other portions of the turbine engine. For example, the disclosure can have applicability for a composite airfoil assembly in other engines or vehicles, and can be used to provide benefits in industrial, commercial, and residential applications. Further, aspects of this disclosure will be directed towards a composite blade assembly including a dovetail. It will be appreciated that aspects this disclosure are directed towards any composite airfoil assembly having a dovetail including, but not limited to, a composite blade assembly or a composite vane assembly.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Further yet, as used herein, the term "fluid" or iterations thereof can refer to any suitable fluid within the gas turbine engine wherein at least a portion of the gas turbine engine is exposed to such as, but not limited to, combustion gases, ambient air, pressurized airflow, working airflow, or any combination thereof. It is yet further contemplated that the gas turbine engine can be other suitable turbine engines such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The term "composite," as used herein is, is indicative of a component having two or more materials. A composite can be a combination of at least two or more metal, non-metallic, or a combination of metal and non-metallic elements or materials. Examples of a composite material can be, but not limited to, a polymer matrix composite (PMC), a ceramic matrix composite (CMC), a metal matrix composite (MMC), carbon fibers, a polymeric resin, thermoplastics, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) or Same Qualified Resin Transfer Molding (SQ-RTM) can be used to form at least a portion of a composite component. Generally, RTM includes the application of dry fibers or matrix material to a mold or cavity. The dry fibers or matrix material can include prepreg, braided material, woven material, or any combination thereof. The dry fibers can define a dry preform. The matrix material can define a precured preform.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

"Preform" as used herein is a three-dimensional composite formed by a plurality of yarns including warp yarns and weft yarns. Additionally, at least one binder yarn that extends partially or fully through the preform in a direction perpendicular to both the warp and weft yarns. The at least one binder yarn can be integrated into the preform through weaving, stitching, tufting, or any appropriate manufacturing process. The preform as referenced herein is a fully formed component that is formed in a separate manufacturing process with respect to the fully formed component.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing, to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

The term "modulus" as used herein is in reference to an object's or material's resistance to being deformed when a stress is applied to it.

The term "skin" as used herein refers to a layer of material having multiple plies or layers of composite materials.

Figure 1:
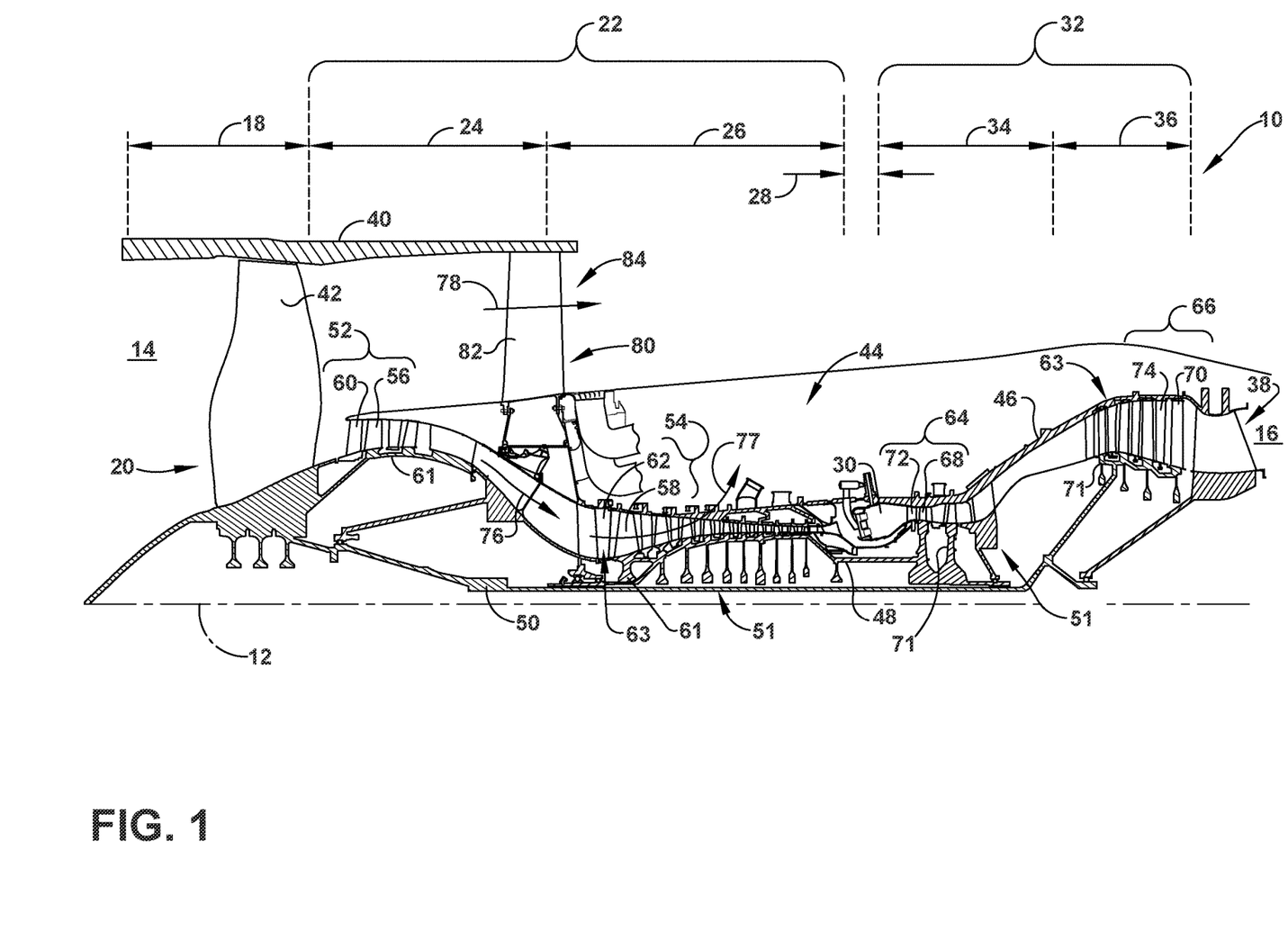
FIG. 1 is a schematic cross-sectional view of a turbine engine in accordance with an exemplary embodiment of the present disclosure.

FIG. 1 is a schematic cross-sectional diagram of a turbine engine 10 for an aircraft. The turbine engine 10 has a generally longitudinally extending axis or engine centerline 12 extending forward 14 to aft 16. The turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the turbine engine 10, which generates combustion gases. The engine core 44 is surrounded by a core casing 46, which can be coupled with the fan casing 40.

An HP shaft or spool 48 disposed coaxially about the engine centerline 12 of the turbine engine 10 drivingly connects the HP turbine 34 to the HP compressor 26. An LP shaft or spool 50, which is disposed coaxially about the engine centerline 12 of the turbine engine 10 within the larger diameter annular HP spool 48, drivingly connects the LP turbine 36 to the LP compressor 24 and fan 20. The spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to (or integral to) a disk 61, which is mounted to the corresponding one of the HP and LP spools 48, 50. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50. The static turbine vanes 72, 74 for a stage of the compressor can be mounted to the core casing 46 in a circumferential arrangement.

Complementary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

In operation, the airflow exiting the fan section 18 is split such that a portion of the airflow is channeled into the LP compressor 24, which then supplies a pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and an exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased above the bleed air temperature. The bleed air 77 may be used to reduce the temperature of the core components downstream of the combustor 30.

A remaining portion of the airflow exiting the fan section 18, a bypass airflow 78, bypasses the LP compressor 24 and engine core 44 and exits the turbine engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the bypass airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
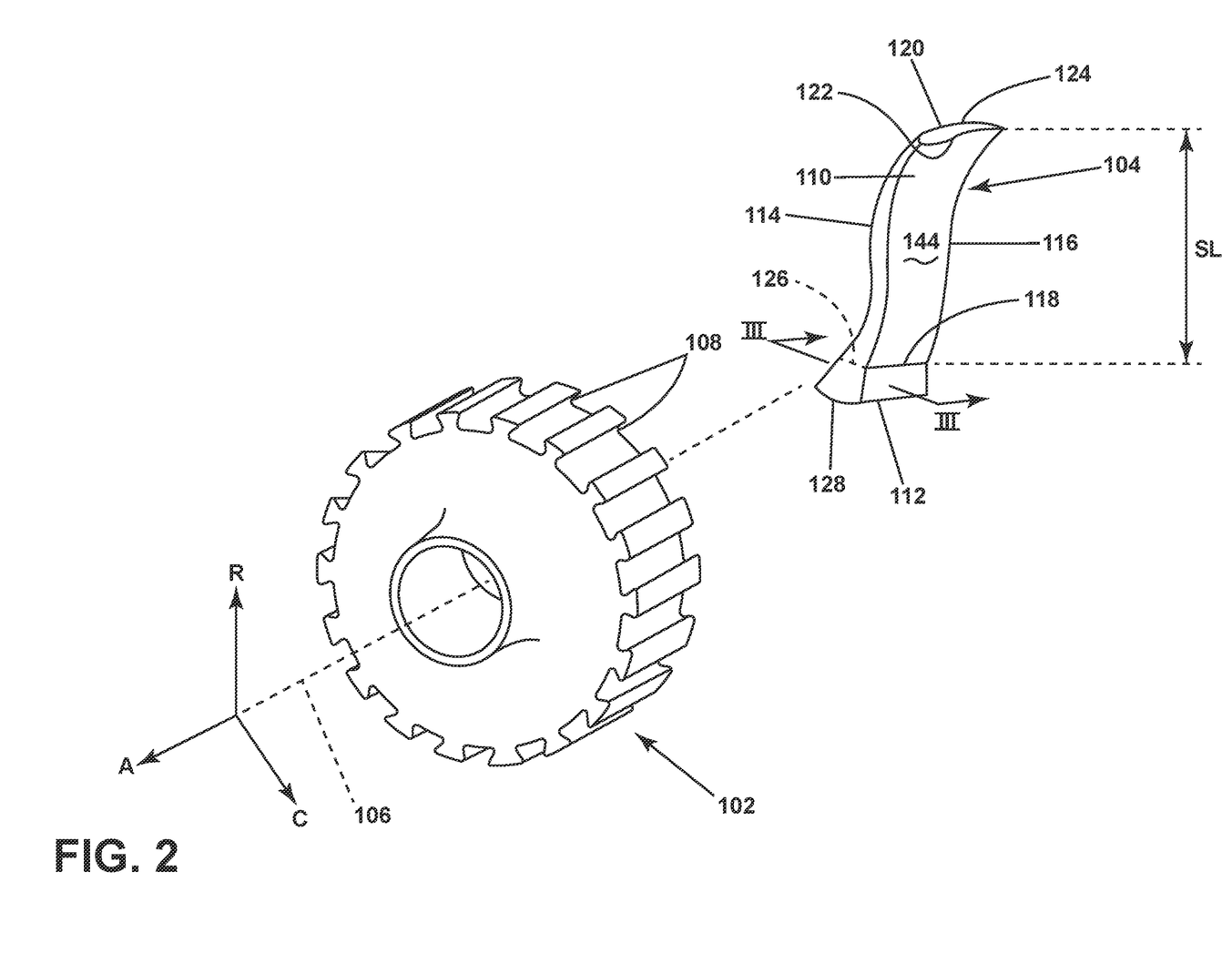
FIG. 2 is a schematic perspective view of a composite airfoil assembly and a disk assembly suitable for use within the turbine engine of FIG. 1, the composite airfoil assembly including an airfoil and a dovetail.

FIG. 2 is a schematic perspective view of a composite airfoil assembly 104 and a disk assembly 102 suitable for use within the turbine engine 10 of FIG. 1. The disk assembly 102 is suitable for use as the disk 61, 71 (FIG. 1) or any other disk such as, but not limited to, a disk within the fan section 18, the compressor section 22, or the turbine section 32 of the turbine engine 10. The composite airfoil assembly 104 can be rotating or non-rotating such that the composite airfoil assembly 104 can include at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the plurality of fan blades 42 (FIG. 1). As a non-limiting example, the composite airfoil assembly 104 can be a composite fan blade assembly.

The disk assembly 102 can be rotatable or stationary about a rotational axis 106. The rotational axis 106 can coincide with or be offset from the engine centerline (e.g., the engine centerline 12 of FIG. 1). The disk assembly 102 includes a plurality of slots 108 extending axially through a radially outer portion of the disk assembly 102 and being circumferentially spaced about the disk assembly 102, with respect to the rotational axis 106. The rotational axis 106 can define a first direction, or axial direction (denoted "A"). The radial direction (denoted "R") extends radially outward and perpendicular to the axial direction A. Further a circumferential direction (denoted "C") extending generally in a circumferential direction with respect to the rotational axis 106, and perpendicular to both the axial direction A and the radial direction R, is illustrated.

The composite airfoil assembly 104 includes an airfoil 110 and a dovetail 112 extending from the airfoil 110. The airfoil 110 extends between a leading edge 114 and a trailing edge 116 to define a chord-wise direction. The airfoil 110 extends between a root 118 and a tip 120 to define a span length (denoted "SL") extending in the radial direction R. The root defines 0% of the span length SL and the tip defines 100% of the span length SL. The airfoil 110 includes an airfoil exterior surface 144 defining a pressure side 122 and a suction side 124 of the airfoil 110. The dovetail 112 extends between a first end 126 and a second end 128 in the radial direction R. The first end 126 denotes a transition between the dovetail 112 and the airfoil 110. As a non-limiting example, the first end 126 coincides with the root 118 of the airfoil 110. The dovetail 112 and the airfoil 110 can be integrally or non-integrally formed with each other.

The composite airfoil assembly 104 is coupled to the disk assembly 102 by inserting at least a portion of the dovetail 112 into a respective slot of the plurality of slots 108 such that the second end 128 faces the disk assembly 102. The composite airfoil assembly 104 is held in place by frictional contact with the slot 108 or can be coupled to the slot 108 via any suitable coupling method such as, but not limited to, welding, adhesion, fastening, or the like. While only a single composite airfoil assembly 104 is illustrated, it will be appreciated that there can be any number of one or more composite airfoils assemblies 104 coupled to the disk assembly 102. As a non-limiting example, there can be a plurality of composite airfoil assemblies 104 corresponding to a total number of slots of the plurality of slots 108. The composite airfoil assembly 104 as discussed herein allows an efficient load transfer from the airfoil 110 through the dovetail 112 to the disk assembly 102.

Figure 3:
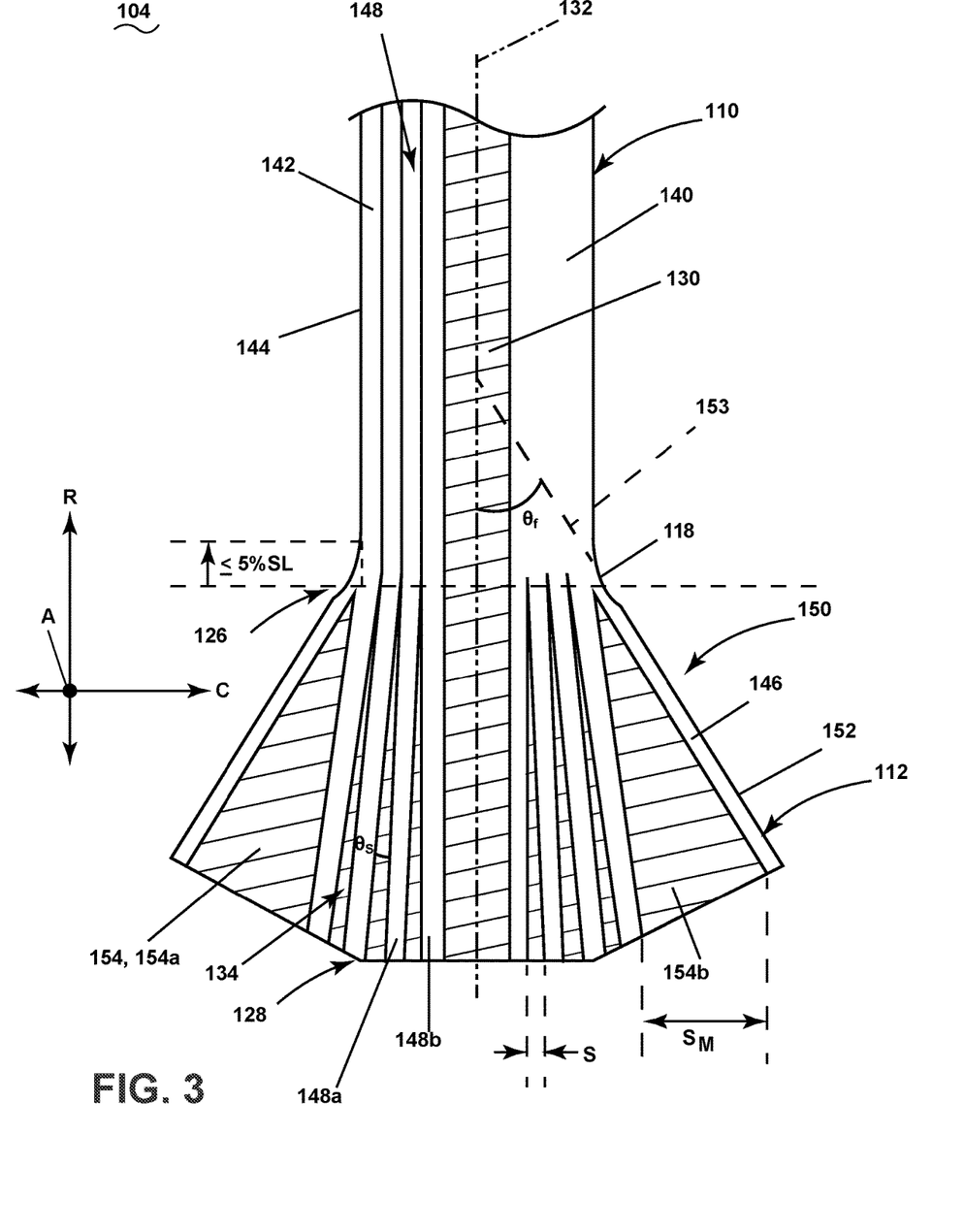
FIG. 3 is a schematic cross-sectional front view of a section of the composite airfoil assembly as seen from sectional line III-III of FIG. 2, further illustrating a composite core, a set of skins, and a composite preform.

FIG. 3 is a schematic cross-sectional front view of a portion of the composite airfoil assembly 104 as seen from sectional line III-III of FIG. 2. The composite airfoil assembly 104 extends along a centerline axis 132 extending from the second end 128 of the dovetail 112 to the tip 120 (FIG. 2) of the airfoil 110. The centerline axis 132 is equidistant from respective opposing portions of the composite airfoil assembly 104. The centerline axis 132 can be linear or non-linear. The composite airfoil assembly 104 can be symmetric or non-symmetric about the centerline axis 132. The centerline axis 132 can also be a body axis, which, in the case of an asymmetrical airfoil, may not extend along the center of the body.

The composite airfoil assembly 104 includes a composite core 130 defining and extending between portions of the dovetail 112 and the airfoil 110. The composite core 130 can extend from the second end 128 to the tip 120 (FIG. 2) along the centerline axis 132. As a non-limiting example, the composite core 130 referred to herein can be include as a braided fabric, a woven fabric, a composite preform, or any combination thereof.

A set of skins 140 overlies the composite core 130. The set of skins can be multiple layered skins 148 including an outer skin 142 and a fan skin 146. The fan skin 146 overlying at least a portion of the outer skin 142. The fan skin 146 can overly the outer skin 142 proximate the root 118 to define the first end 126 of the dovetail 112. The fan skin 146 can overly the outer skin 142 radially above the first end 126 an amount that is less than or equal to 5% of the span length SL (FIG. 2). The fan skin 146 can further define a dovetail exterior surface 152 of the dovetail 112. As a non-limiting example, skin(s) as referred to herein can be defined as a laminate skin, a woven skin or a braided skin, or any combination thereof. The set of skins 140 can be any suitable type of skin and include at least one woven skin or at least one braided skin. Further, the set of skins 140 can include at least one of a filler ply or a machine ply.

The composite core 130, and the set of skins 140 can define various portions of the airfoil 110 and the dovetail 112. The outer skin 142 can define at least a portion of the airfoil exterior surface 144. The multiple layered skins 148 can include layers of skins located between the composite core 130 and the outer skin 142. The multiple layered skins 148 can extend into at least a portion of the airfoil 110 and the dovetail 112. The multiple layered skins 148 can be layered directly in contact with adjacent skins 148a, 148b in the airfoil 110.

At least one insert 134 forms a portion of the dovetail 112 with a flared cross-section 150. The at least one insert 134 is located between adjacent skins 148a, 148b to define the flared cross-section 150 where the multiple layered skins 148 fan outward away from each other and from the centerline axis 132. The at least one insert 134 can have a triangular cross-sectional shape defining a skin ply angle $\theta_s$ to provide an increasing amount of spacing between adjacent skins 148a, 148b. In other words, the multiple layered skins 148 can transition from being directly in contact with adjacent skins 148a, 148b at the first end 126 to being gradually spaced the increasing amount between the same adjacent skins 148a, 148b at the second end 128. The at least one insert 134 is formed to provide a predefined spacing (denoted "S") between adjacent skins 148a, 148b. The predefined spacing S amount is measured along the circumferential direction C and is maximized at the second end 128. The at least one insert 134 can be a single filler material, a composite material, a composite preform, or any combination of materials.

At least one insert 134 is a composite preform 154 defining at least a portion of the flared cross-section 150. The composite preform 154 can be located between any skin in the set of skins 140. In one non-limiting example, the composite preform 154 is located between the outer skin 142 and the fan skin 146. The fan skin 146 transitions from being directly in contact with the outer skin 142 at the first end 126 to being gradually spaced the increasing amount toward the second end 128. As illustrated, the fan skin 146 fans outward away from the centerline axis 132 hinging from the first end 126 to define the dovetail exterior surface 152. Two inserts 134 can be a pair of composite preforms 154a, 154b defining both sides of the flared cross-section 150 with respect to the centerline axis 132.

The composite preform 154 is formed to provide most of the fanning out for the composite airfoil assembly 104. The composite preform 154 provides a maximum spaced amount (denoted "$S_M$") measured along a line perpendicular to the centerline axis 132 and between the outer skin 142 and the fan skin 146 at the second end 128. The maximum spaced amount $S_M$ is less than or equal to 2.5 inches ($S_M \leq 2.5$ in) or less than or equal to 6.4 cm ($S_M \leq 6.4$ cm). This reduces the skin ply angle $\theta_s$ when transitioning from the airfoil 110 to the dovetail 112. In other words, the predefined spacing S is reduced by adding the composite preform 154. A line 153 extending perpendicular to the axial direction A and tangentially from the dovetail exterior surface 152 intersects the centerline axis 132 at a fan angle $\theta_f$ to define an amount of fanning outward and away from the centerline 132. The fan angle $\theta_f$ can be between 0 and 45° ($0 < \theta_f \leq 45°$). It is further contemplated that the outer skin 142 and the fan skin 146 are integrally formed, or one continuous piece and that the outer skin 142 bends outwardly from the first end 126 at the fan angle $\theta_f$.

Figure 4:
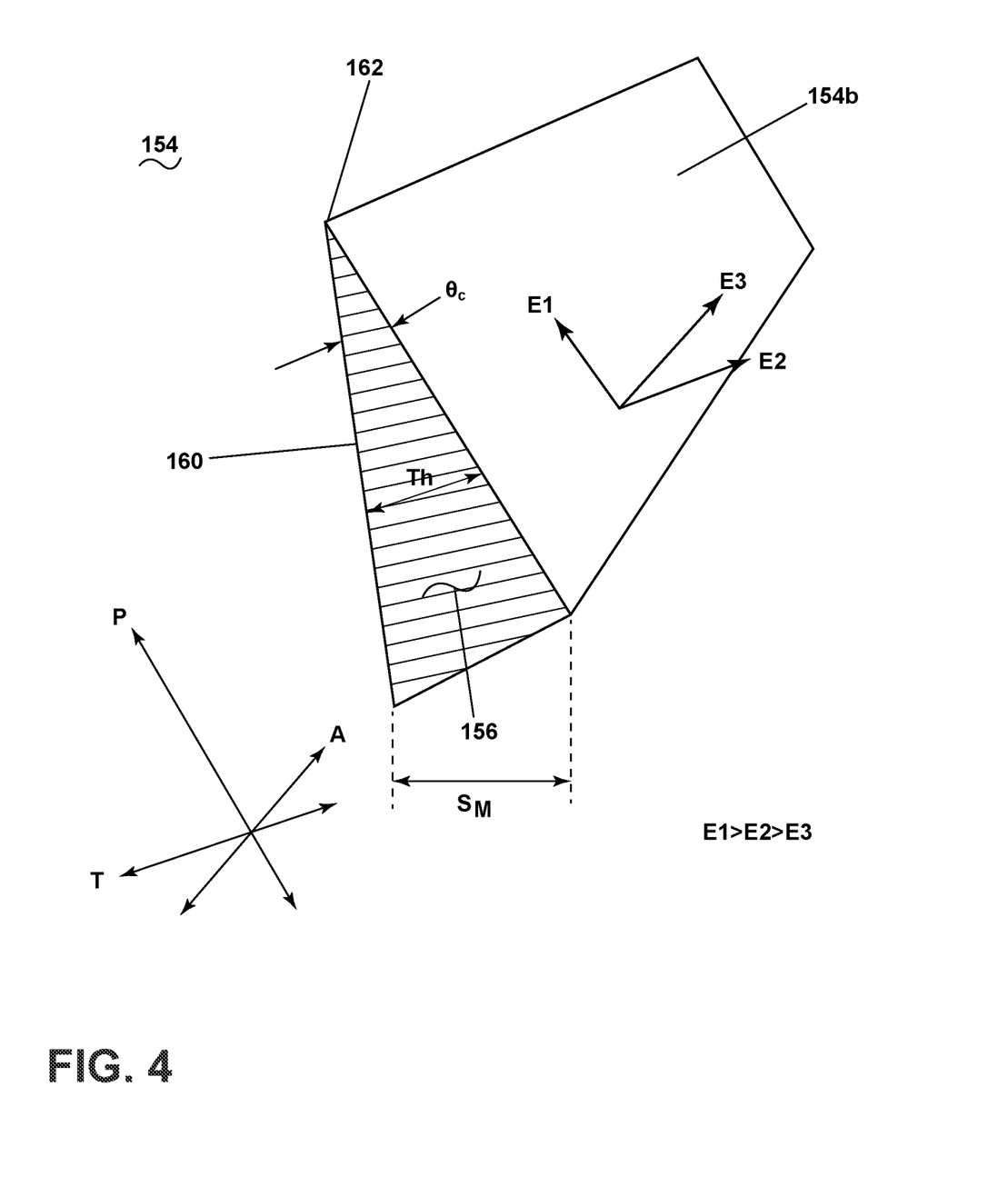
FIG. 4 is an enlarged schematic perspective view of the composite preform.

Turning to FIG. 4, an enlarged perspective schematic view of a single composite preform 154 of FIG. 3 is illustrated. Any of the at least one inserts 134 disclosed herein can embody the same characteristics as the single composite preform 154 illustrated. The composite preform 154 can have a triangular cross-sectional shape 160 with an apex 162 having a congruent angle $\theta_c$ to the fan angle $\theta_f$. The composite preform 154 can include at least one material 156 oriented in three different directions commonly referred to as a warp, a weft, and a binder orientation when a woven process is utilized to form the composite preform 154. While described as a woven process, it should be understood that any process resulting in the orientations described herein is contemplated. The at least one material 156 can be a single type of material oriented in the three different directions, or multiple types of materials oriented in the three different directions. Specifically, the composite preform 154 is formed from the at least one material 156 with the binder orientation in the axial direction A and having a lowest modulus (denoted "E3") for the composite preform 154. The at least one material 156 is further oriented with the warp orientation along a second direction (denoted "P") parallel to the dovetail exterior surface 152 (FIG. 3) and having a highest modulus (denoted "E1"). The at least one material 156 is further woven with the weft orientation along a third direction (denoted "T") perpendicular to the second direction P and parallel to a thickness (denoted "Th") of the composite preform 154 and associated with a middle modulus (denoted "E2"). In other words, the highest modulus E1 is greater than the middle modulus E2, which in turn is greater than the lowest modulus E3 (E1>E2>E3).

Moving from the dovetail exterior surface 152 (FIG. 3) toward the centerline axis 132 (FIG. 3), the second direction P becomes increasingly closer to being parallel with the radial direction R. Likewise, the third direction T becomes increasingly closer to being parallel with the circumferential direction C (FIG. 3). In other words, when the at least one insert 134 has the same characteristics as the composite preform 154 and is located closer to the centerline axis 132, the warp orientation is close to or parallel with the radial direction R. Likewise, the weft orientation is close to or parallel with the circumferential direction C.

Figure 5:
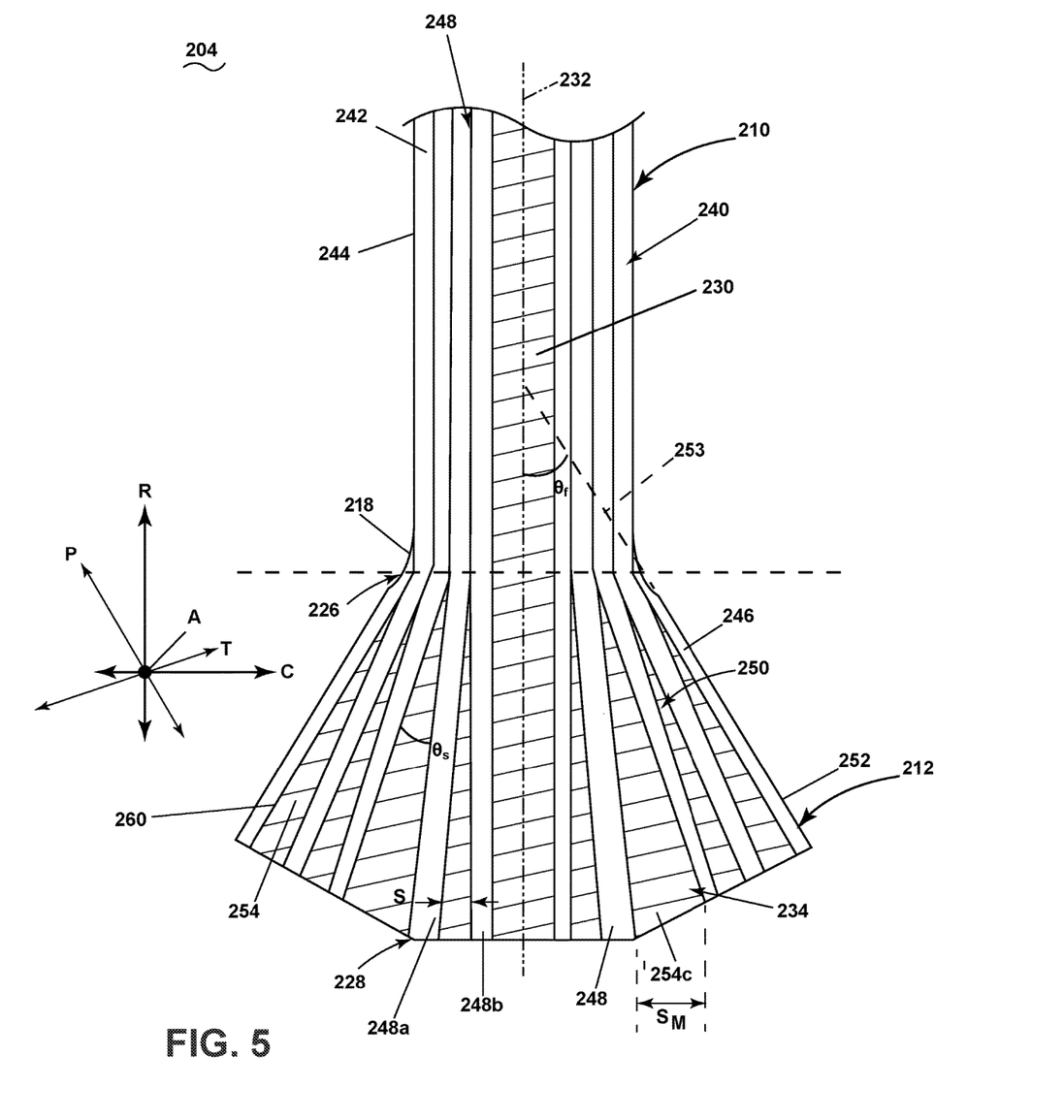
FIG. 5 is a schematic cross-sectional front view of a variation of the section of the composite airfoil from FIG. 3 according to another aspect of the disclosure herein with multiple composite preforms.

Turning to FIG. 5, a composite airfoil assembly 204 according to another aspect of the disclosure herein is illustrated. The composite airfoil assembly 204 is similar to the composite airfoil assembly 104 therefore, like parts will be identified with like numerals increased by 100, with it being understood that the description of the like parts of the composite airfoil assembly 104 applies to the composite airfoil assembly 204, except where noted.

A composite core 230, and a set of skins 240 can define various portions of an airfoil 210 and a dovetail 212. The dovetail 212 can extend between a first end 226 and a second end 228 in the radial direction R. The first end 226 denotes a transition between the dovetail 212 and the airfoil 210. As a non-limiting example, the first end 226 coincides with a root 218 of the airfoil 110. The dovetail 212 and the airfoil 210 can be integrally or non-integrally formed with each other. The set of skins 240 can be multiple layered skins 248 including an outer skin 242 and a fan skin 246. In the dovetail 212 the multiple layered skins 248 fan outward away each other and from a centerline axis 232. In other words, the multiple layered skins 248 can transition from being directly in contact with adjacent skins 248a, 248b at the first end 226 of the dovetail 212 to being gradually spaced an increasing amount between the same adjacent skins 248a, 248b at the second end 228. The fan skin 246 overlies at least a portion of the outer skin 242. The outer skin 242 can define at least a portion of an airfoil exterior surface 244. A line 253 extending perpendicular to the axial direction A and tangentially from the dovetail exterior surface 252 intersects the centerline axis 232 at a fan angle $\theta_f$ to define an amount of fanning outward and away from the centerline 232. It is further contemplated that the outer skin 242 and the fan skin 246 are integrally formed, or formed as one continuous piece, wherein the outer skin 242 bends outwardly from the first end 226 at the fan angle $\theta_f$.

Multiple inserts 234 form a portion of the dovetail 212 with a flared cross-section 250. The multiple inserts 234 are located between adjacent skins 248a, 248b as illustrated to define the flared cross-section 250 and to provide a predefined spacing (denoted "S"). Each insert of the multiple inserts 234 can have a triangular cross-sectional shape 260 defining a skin ply angle $\theta s$ to provide the predefined spacing S between adjacent skins 248a, 248b. The skin ply angle $\theta s$ can be smaller than the fan angle $\theta_f$ ($\theta_s < \theta_f$). The skin ply angle $\theta_s$ can vary among the multiple inserts 234. The skin ply angle $\theta$, can be equal to or between 0 and 45 degrees ($0° \leq \theta_s \leq 45°$.

The multiple inserts 234 can each be a composite preform 254 formed from material oriented in three different directions. Specifically, forming the composite preform 254 from preform material like the composite preform 154 previously described herein. The binder orientation is associated with a lowest modulus E3, the warp orientation is associated with a highest modulus E1, and the weft orientation is associated with a middle modulus E2, where the highest modulus E1 is greater than the middle modulus E2 which in turn is greater than the lowest modulus E3 (E1>E2>E3). Moving from the dovetail exterior surface 252 toward the centerline axis 232, the warp orientation extends along a second direction P, which becomes increasingly closer to being parallel with the radial direction R for composite preforms 254 that are closer to the centerline. Likewise, the weft orientation extends along a third direction T, which becomes increasingly closer to being parallel with the circumferential direction C. In other words, the composite preforms 254 closest to the centerline axis 232 have the highest modulus E1 oriented close to or parallel with the radial direction R. Likewise, the composite preforms 254 closest to the centerline axis 232 have the middle modulus E2 oriented close to or parallel with the circumferential direction C. The composite preforms 254 are formed with the skin ply angle $\theta_s$. Multiple composite preforms 254 enable the same transition from airfoil 110 to dovetail 112 discussed previously herein while also reducing layup time.

At least one composite preform 254c provides a maximum spaced amount (denoted "$S_M$") measured along a line perpendicular to the centerline axis 232 and between adjacent skins of the multiple layered skins 248. The maximum spaced amount $S_M$ is less than or equal to 2.5 inches ($S_M \leq 2.5$ in) or less than or equal to 6.4 cm ($S_M \leq 6.4$ cm).

Figure 6:
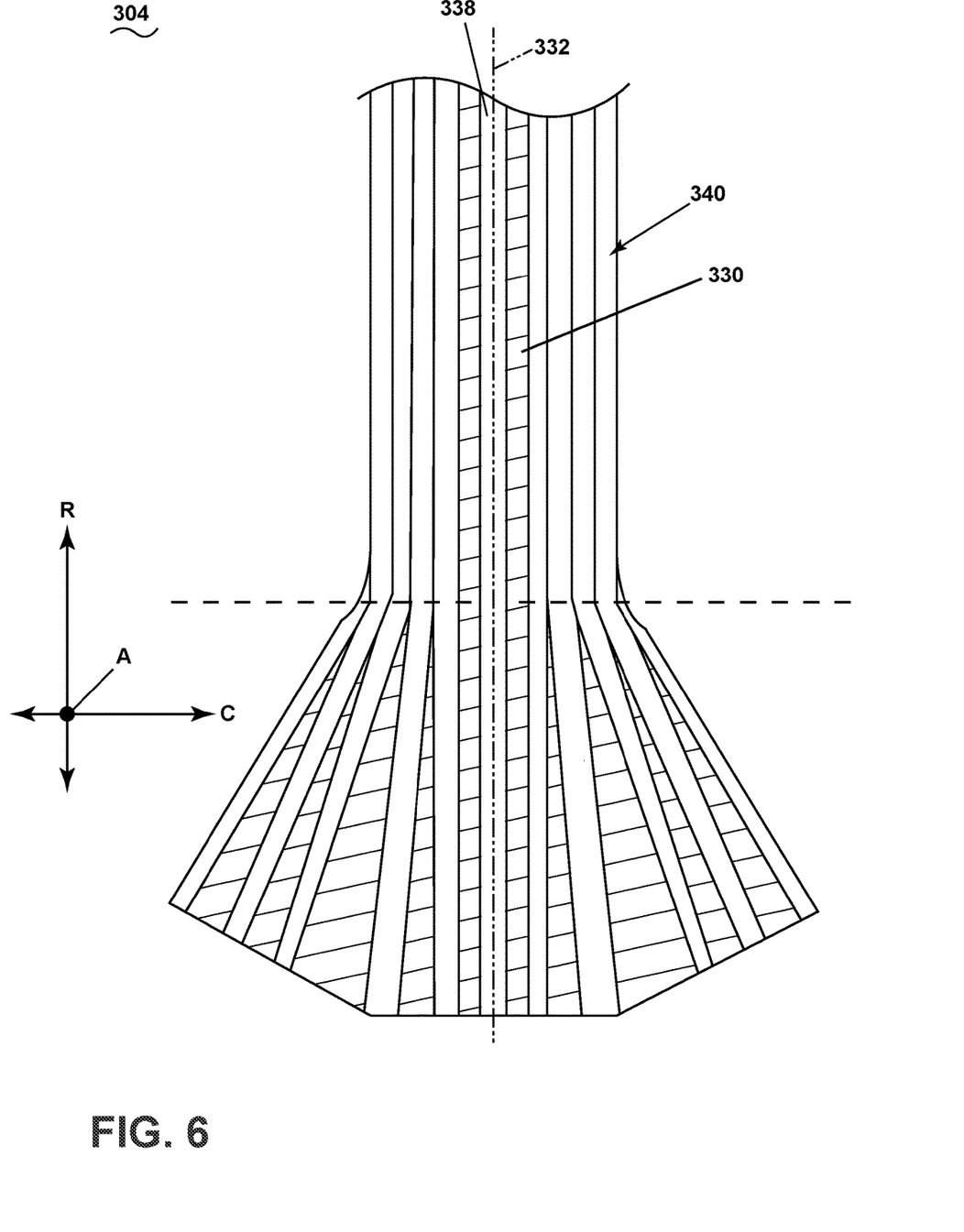
FIG. 6 is a schematic cross-sectional front view of a variation of the section of the composite airfoil from FIG. 5 according to yet another aspect of the disclosure herein with a midplane skin.

Turning to FIG. 6, a composite airfoil assembly 304 according to another aspect of the disclosure herein is illustrated. The composite airfoil assembly 304 is similar to the composite airfoil assembly 204 of FIG. 5 except for the following distinct features. The composite airfoil assembly 304 extends along a centerline axis 332. The centerline axis 332 is equidistant from respective opposing portions of the composite airfoil assembly 304. The centerline axis 332 can be linear or non-linear. The composite airfoil assembly 304 can be symmetric or non-symmetric about the centerline axis 332. The centerline axis 332 can also be a body axis, which, in the case of an asymmetrical airfoil, may not extend along the center of the body. A composite core 330 can extend radially through the composite airfoil assembly 304 along the centerline axis 332. A set of skins 340 can include a mid-plane skin 338 located within the composite core 330. The mid-plane skin 338 can define the centerline axis 332. The mid-plane skin 338 can include materials oriented in the warp, weft, and binder orientations previously described herein. While illustrated as an addition to the composite airfoil assembly 204 (FIG. 5), it should be understood that the mid-plane skin 338 can also be provided in the composite airfoil assembly 104 (FIG. 3).

Benefits associated with the use of a composite airfoil assembly include a lighter airfoil assembly without sacrificing performance of the airfoil assembly when compared to a non-composite (e.g., cast) airfoil assembly. In other words, the material used for the composite airfoil assembly are lighter than the materials used for the non-composite airfoil assembly and do not sacrifice the ability to perform as intended within the turbine engine. The decreased weight, in turn, means an increased efficiency of the turbine engine when compare to a conventional turbine engine including the non-composite airfoil assembly.

Further benefits associated with the composite airfoil assembly include an airfoil assembly able to withstand the mechanical stresses associated with the operation of the composite airfoil assembly when compared to a conventional composite airfoil assembly. Specifically, the highest modulus is generally in the direction of the highest transfer load between the airfoil and dovetail, i.e., the spanwise direction of the airfoil. Likewise, the middle, or second highest modulus is generally in the direction of the second highest transfer load between the airfoil and dovetail, i.e., the chordwise direction of the airfoil. Purposefully forming the composite preforms with these orientations contributes to a more robust composite airfoil assembly.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A composite airfoil assembly for a turbine engine, the composite airfoil assembly comprising an airfoil extending in a radial direction between a root and a tip to define a span length, the airfoil comprising a composite core and a set of skins overlying the composite core, the set of skins including an outer skin defining at least a portion of an exterior surface of the airfoil; and a dovetail extending radially below the root between a first end and a second end, the dovetail comprising the composite core, at least one insert comprising a composite preform, and the set of skins, including a fan skin overlying the at least one insert; wherein the composite preform defines at least one portion of a flared cross-section of the dovetail.

The composite airfoil assembly of any preceding clause, wherein the at least one insert comprises a triangular cross-sectional shape defining a fan angle.

The composite airfoil assembly of any preceding clause, wherein the fan skin extends away from the outer skin at the fan angle.

The composite airfoil assembly of any preceding clause, wherein the fan angle is less than or equal to 45 degrees.

The composite airfoil assembly of any preceding clause, wherein the set of skins comprises multiple layered skins.

The composite airfoil assembly of any preceding clause, wherein the at least one insert is multiple inserts.

The composite airfoil assembly of any preceding clause, wherein the multiple inserts separate adjacent skins from each other.

The composite airfoil assembly of any preceding clause, wherein the root defines 0% of the span length and the tip defines 100% of the span length and the fan skin extends radially above the root an amount that is less than or equal to 5% of the span length.

The composite airfoil assembly of any preceding clause, wherein the composite core comprises either a braided fabric, a woven fabric, or a composite preform.

The composite airfoil assembly of any preceding clause, wherein the set of skins comprises at least one laminate skin or at least one braided skin The composite airfoil assembly of any preceding clause, wherein the set of skins comprises at least one of a filler ply or a machine ply.

The composite airfoil assembly of any preceding clause, wherein the composite preform is formed from at least one material oriented in a first direction associated with a lowest modulus, a second direction associated with a highest modulus, and a third direction associated with a middle modulus The composite airfoil assembly of any preceding clause, wherein the first direction is oriented along an axial direction of the dovetail, the third direction is oriented along a thickness of the dovetail, and the second direction is perpendicular to the first direction and the third direction.

The composite airfoil assembly of any preceding clause wherein the set of skins are prepregs.

The composite airfoil assembly of any preceding clause, wherein the composite preform is a dry preform or a precured preform and is combined with the prepregs by Resin Transfer Molding (RTM) or Same Qualified Resin Transfer Molding (SQ-RTM).

The composite airfoil assembly of any preceding clause, wherein at least a portion of the composite core and at least a portion of the set of skins each include a composite material including at least one of a polymer matrix composite, a ceramic matrix composite, a metal matrix composite, a carbon fiber, a polymeric resin, a thermoplastic, a bismaleimide, a polyimide, an epoxy resin, a glass fiber, or a silicon matrix.

The composite airfoil assembly of any preceding clause, wherein the airfoil is a blade and the turbine engine includes a fan section, a compressor section, a combustion section and a turbine section in serial flow arrangement with the composite airfoil assembly being provided within the fan section.

The composite airfoil assembly of any preceding clause, wherein the fan skin defines another portion of the flared cross-section.

The composite airfoil assembly of any preceding clause, wherein the fan skin overlies the outer skin at the first end.

The composite airfoil assembly of any preceding clause, wherein the fan skin extends away from the outer skin at a fan angle.

The composite airfoil assembly of any preceding clause, wherein the fan angle is less than or equal to 30 degrees.

The composite airfoil assembly of any preceding clause, wherein the at least one insert is multiple inserts, each comprising a composite preform.

The composite airfoil assembly of any preceding clause, wherein the multiple inserts together with the set of skins define the flared cross-section of the dovetail.

A composite airfoil assembly for a turbine engine, the composite airfoil assembly comprising an airfoil extending in a radial direction between a root and a tip to define a span length, the airfoil comprising a composite core and a set of skins overlying the composite core, the set of skins including an outer skin defining at least a portion of an exterior surface of the airfoil; and a dovetail extending radially below the root and having a flared cross-section, the dovetail comprising the composite core, at least one insert comprising a composite preform, and the set of skins, including a fan skin overlying the at least one insert and extending away from the outer skin at a fan angle; wherein the fan angle is less than or equal to 30 degrees.

The composite airfoil assembly of any preceding clause, wherein the set of skins comprises multiple layered skins.

The composite airfoil assembly of any preceding clause, wherein the at least one insert is multiple inserts and wherein the multiple inserts separate adjacent skins from each other.

The composite airfoil assembly of any preceding clause wherein the fan skin overlies the outer skin at the first end.

The composite airfoil assembly of any preceding clause wherein the composite preform defines at least one portion of a flared cross-section of the dovetail and the fan skin defines another portion of the flared cross-section.

What is claimed is:

1. A composite airfoil assembly for a turbine engine, the composite airfoil assembly comprising:
    an airfoil extending in a radial direction between a root and a tip to define a span length, the airfoil comprising a composite core and a set of skins overlying the composite core, the set of skins including an outer skin defining at least a portion of an exterior surface of the airfoil; and
    a dovetail extending radially below the root between a first end and a second end, the dovetail comprising the composite core, at least one insert comprising a composite preform, and the set of skins, including a fan skin overlying the at least one insert;
    wherein the composite preform is formed from at least one material oriented in at least a first direction associated with a first modulus and a second direction associated with a second modulus, the first modulus being a higher modulus than the second modulus.

2. The composite airfoil assembly of claim 1, wherein the at least one insert comprises a triangular cross-sectional shape defining a fan angle.

3. The composite airfoil assembly of claim 2, wherein the fan skin extends away from the outer skin at the fan angle.

4. The composite airfoil assembly of claim 3, wherein the fan angle is less than or equal to 45 degrees.

5. The composite airfoil assembly of claim 1, wherein the set of skins comprises multiple layered skins.

6. The composite airfoil assembly of claim 1, wherein the at least one insert is multiple inserts.

7. The composite airfoil assembly of claim 6, wherein the multiple inserts separate adjacent skins from each other.

8. The composite airfoil assembly of claim 1, wherein the root defines 0% of the span length and the tip defines 100% of the span length and the fan skin extends radially above the root an amount that is less than or equal to 5% of the span length.

9. The composite airfoil assembly of claim 1, wherein the composite core comprises either a braided fabric, a woven fabric, or a composite preform.

10. The composite airfoil assembly of claim 1, wherein the set of skins comprises at least one laminate skin or at least one braided skin.

11. The composite airfoil assembly of claim 1, wherein the set of skins comprises at least one of a filler ply or a machine ply.

12. The composite airfoil assembly of claim 1, wherein the at least one material is further oriented in a third direction associated with a middle modulus between the first modulus and second modulus.

13. The composite airfoil assembly of claim 12, wherein the first direction is oriented along an axial direction of the dovetail, the third direction is oriented along a thickness of the dovetail, and the second direction is perpendicular to the first direction and the third direction.

14. The composite airfoil assembly of claim 1 wherein the set of skins are prepregs.

15. The composite airfoil assembly of claim 14 wherein the composite preform is a dry preform or a precured preform and is combined with the prepregs by Resin Transfer Molding (RTM) or Same Qualified Resin Transfer Molding (SQ-RTM).

16. The composite airfoil assembly of claim 1, wherein at least a portion of the composite core and at least a portion of the set of skins each include a composite material including at least one of a polymer matrix composite, a ceramic matrix composite, a metal matrix composite, a carbon fiber, a polymeric resin, a thermoplastic, a bismaleimide, a polyimide, an epoxy resin, a glass fiber, or a silicon matrix.

17. The composite airfoil assembly of claim 1, wherein the airfoil is a blade and the turbine engine includes a fan section, a compressor section, a combustion section and a turbine section in serial flow arrangement with the composite airfoil assembly being provided within the fan section.

18. A composite airfoil assembly for a turbine engine, the composite airfoil assembly comprising:
    an airfoil extending in a radial direction between a root and a tip to define a span length, the airfoil comprising a composite core and a set of skins overlying the composite core, the set of skins including an outer skin defining at least a portion of an exterior surface of the airfoil; and
    a dovetail extending radially below the root and having a flared cross-section, the dovetail comprising the composite core, at least one insert comprising a composite preform, and the set of skins, including a fan skin overlying the at least one insert and extending away from the outer skin at a fan angle;
    wherein the fan angle is less than or equal to 30 degrees; and
    wherein the composite preform is formed from at least one material oriented in at least a first direction associated with a first modulus and a second direction associated with a second modulus, the first modulus being a higher modulus than the second modulus.

19. The composite airfoil assembly of claim 18, wherein the set of skins comprises multiple layered skins.

20. The composite airfoil assembly of claim 19, wherein the at least one insert is multiple inserts and wherein the multiple inserts separate adjacent skins from each other.

* * * * *